US012623484B2

(12) United States Patent
Migas et al.

(10) Patent No.: US 12,623,484 B2
(45) Date of Patent: May 12, 2026

(54) REMOVABLE AERODYNAMIC WHEEL COVER

(71) Applicant: mantaLABS LLC, Crawfordsville, IN (US)

(72) Inventors: Jeremiah Migas, Crawfordsville, IN (US); Raul Maturana, Brownsburg, IN (US); Zachary McCoy, Whitestown, IN (US)

(73) Assignee: MANTALABS LLC, Crawfordsville, IN (US)

( * ) Notice: Subject to any disclaimer, the term of this patent is extended or adjusted under 35 U.S.C. 154(b) by 323 days.

(21) Appl. No.: 18/483,065

(22) Filed: Oct. 9, 2023

(65) Prior Publication Data

US 2024/0123761 A1 Apr. 18, 2024

Related U.S. Application Data

(60) Provisional application No. 63/379,331, filed on Oct. 13, 2022.

(51) Int. Cl.
B60B 7/06 (2006.01)
B60B 7/04 (2006.01)

(52) U.S. Cl.
CPC ................ B60B 7/066 (2013.01); B60B 7/04 (2013.01); *B60B 2900/1216* (2013.01)

(58) Field of Classification Search
CPC ......... B60B 7/066; B60B 7/0066; B60B 7/04; B60B 7/08; B60B 2900/1216
See application file for complete search history.

(56) References Cited

U.S. PATENT DOCUMENTS

| | | | |
|---|---|---|---|
| 3,317,247 A | 5/1967 | Lamme | |
| 3,585,824 A | 6/1971 | Schenk | |

(Continued)

FOREIGN PATENT DOCUMENTS

| | | | | |
|---|---|---|---|---|
| EP | 3037277 A1 | * | 6/2016 | ............... B60B 7/12 |
| KR | 19980042086 U | * | 9/1998 | ............... B60B 7/08 |
| KR | 20120052445 A | * | 5/2012 | ............... B60B 7/06 |

OTHER PUBLICATIONS

"HaloDisc, A Wheel Cover Makes Your Tesla Look Sexier", Kickstarter, Nov. 9, 2021 (https://www.kickstarter.com/projects/halodisc/halodisc-a-wheel-cover-makes-your-tesla-look-sexier) Accessed no later than Oct. 25, 2023.

(Continued)

*Primary Examiner* — Kip T Kotter
(74) *Attorney, Agent, or Firm* — NIXON PEABODY LLP

(57) ABSTRACT

A removable wheel cover includes a disc and a shaft assembly. The shaft assembly is attached to the disc. The shaft assembly includes a splined shaft, a piston, a piston spring, a push button mechanism, and an internal shaft. The piston forms an opening in which the internal shaft extends and moves therein. An exterior walled structure of the push button mechanism surrounds at least a portion of the walled structure of the piston. A walled structure of the splined shaft surrounds at least a portion of the exterior walled structure of the push button mechanism. The piston spring biases the piston in a direction away from a top surface of the push button mechanism. The push button mechanism moves to assist in unlocking the removable wheel cover indirectly or directly from a wheel.

31 Claims, 9 Drawing Sheets

(56)     References Cited

U.S. PATENT DOCUMENTS

| 4,043,685 | A | * | 8/1977 | Hyams | B60B 7/04 |
| | | | | | 403/376 |
| 5,234,260 | A | * | 8/1993 | Coombes, Jr. | B60B 7/0013 |
| | | | | | 301/37.38 |
| 5,931,543 | A | | 8/1999 | Smith | |
| 6,857,708 | B2 | * | 2/2005 | Hartl | B60B 7/04 |
| | | | | | 301/37.31 |
| D752,494 | S | | 3/2016 | Polka | |
| 9,327,550 | B2 | | 5/2016 | Butler | |
| 9,511,624 | B2 | | 12/2016 | Polka | |
| 9,561,687 | B2 | | 2/2017 | Polka | |
| 9,682,597 | B1 | * | 6/2017 | Mavrofrides | B60B 7/08 |
| 10,513,144 | B2 | | 12/2019 | Heck | |
| 10,543,716 | B1 | * | 1/2020 | Mavrofrides | B60B 7/066 |
| 11,207,915 | B1 | * | 12/2021 | Mavrofrides | B60B 7/065 |
| 2005/0146204 | A1 | | 7/2005 | Kim | |
| 2013/0076107 | A1 | * | 3/2013 | Starnes | B60B 7/00 |
| | | | | | 301/37.102 |
| 2025/0128541 | A1 | | 4/2025 | Rodrigues | |

OTHER PUBLICATIONS

"Tesla Model 3 (2020-2023) 18-inch Hub Caps (Set of 4)", Mayde (https://www.mayde.us/products/mayde-wheel-covers-for-tesla-model-3?variant=41428058570904) Accessed no later than Oct. 25, 2023.
"Wheel Cover Kits: Fuel-Saving Aerodynamics for Tractor and Trailer", FlowBelow (https://www.flowbelow.com/wheel-cover-kits) Accessed no later than Oct. 25, 2023.
"Aerodynamic Wheel Covers", RealWheels Corporation (https://www.realwheels.com/aerodynamic-wheel-covers/) Accessed no later than Oct. 25, 2023.
"MagBak RimCase for Tesla Model 3 & Y (4 Pack)", MagBak (https://magbak.com/products/magbak-rim-protector?utm_source=google&utm_medium=&utm_campaign=&utm_term=&gad=1&gclid=CjwKCAjw-eKpBhAbEiwAqFL0mvb3Jn7adHhCPBRCUkcTO2W-4qpGdKn2KMgpVoD0IC7Jh7_JlfTc6BoCMVUQAvD_BwE) Accessed no later than Oct. 25, 2023.

* cited by examiner

REMOVABLE AERODYNAMIC WHEEL COVER

CROSS-REFERENCE TO RELATED APPLICATION

This application claims priority to and the benefit of U.S. Provisional Application No. 63/379,331 filed Oct. 13, 2022 and entitled "Removable Aerodynamic Wheel Cover," the contents of which are herein incorporated by reference in their entirety.

FIELD OF THE INVENTION

The present invention relates generally to an aerodynamic wheel cover. More specifically, the wheel cover locks indirectly or directly with a wheel and is configured to be easily released by a user.

BACKGROUND OF THE INVENTION

Wheel covers have been used to cover wheels in the automotive industry for many years. One disadvantage of many such wheel covers is the difficulty for users to install and release the wheel cover from the wheel. This is especially important in wheel covers that are used with electric vehicles due to the increased emphasis on range. Improved aerodynamics are more important on longer high-speed trips, and aesthetics are more important on shorter, low-speed trips. It would be desirable to provide an easily removable aerodynamic wheel cover that overcomes such problems.

SUMMARY

According to one aspect of the present disclosure, a removable wheel cover includes a disc and a shaft assembly. The shaft assembly is attached to the disc. The shaft assembly includes a splined shaft, a piston, a piston spring, a push button mechanism, and an internal shaft. The piston includes a walled structure forming an opening in which the internal shaft extends and moves therein. The push button mechanism further includes an exterior walled structure that is bridged by a top surface. The exterior walled structure of the push button mechanism surrounds at least a portion of the walled structure of the piston. The splined shaft includes a walled structure. The walled structure of the splined shaft surrounds at least a portion of the exterior walled structure of the push button mechanism. The piston spring biases the piston in a direction away from the top surface of the push button mechanism. The push button mechanism is configured to move to assist in unlocking the removable wheel cover indirectly or directly from a wheel.

According to a configuration of the above implementation, the disc is generally circular.

According to another configuration of the above implementation, the disc forms a plurality of apertures therein.

According to a further configuration of the above implementation, the shaft assembly further includes a button spring. The button spring biases the top surface of the push button mechanism in a direction toward the piston.

In a further aspect of the above implementation, the shaft assembly is removably attached to the disc. The shaft assembly is removably attached to the disc via at least one screw in one embodiment.

In yet a further aspect of the above implementation, the internal shaft is a piston screw.

According to a configuration of the above implementation, the shaft assembly further includes a plurality of ball bearings. The plurality of ball bearings assists in locking and unlocking the removable wheel cover indirectly or directly from the wheel.

According to another configuration of the above implementation, the splined shaft includes at least one opening and the push button mechanism includes at least one detent. The at least one opening of the splined shaft and the at least one detent of the push button mechanism is configured to receive at least a portion of each of the plurality of ball bearings and assist in unlocking the removable wheel cover indirectly or directly from the wheel.

According to a further configuration of the above implementation, the push button mechanism includes a plurality of detents. Each of the plurality of detents has a semi-circular cross section.

In a further aspect of the above implementation, the shaft assembly further includes an expanding ring. The expanding ring assists in locking and unlocking the removable wheel cover indirectly or directly from the wheel.

In a further aspect of the above implementation, the shaft assembly is a splined shaft assembly.

In yet a further aspect of the above implementation, the removable wheel cover is directly locked to the wheel. In another aspect of the above implementation, the removable wheel cover is indirectly locked to the wheel.

According to another aspect of the present disclosure, a removable wheel cover assembly includes a removable wheel cover and a splined hub. The removable wheel cover includes a disc and a splined shaft assembly. The splined shaft assembly is attached to the disc. The splined shaft assembly includes a splined shaft, a piston, a piston spring, a push button mechanism, and an internal shaft. The piston includes a walled structure forming an opening in which the internal shaft extends and moves therein. The push button mechanism further includes an exterior walled structure that is bridged by a top surface. The exterior walled structure of the push button mechanism surrounds at least a portion of the walled structure of the piston. The splined shaft includes a walled structure. The walled structure of the splined shaft surrounds at least a portion of the exterior walled structure of the push button mechanism. The piston spring biases the piston in a direction away from the top surface of the push button mechanism. The splined hub includes a walled structured with an opening formed therein. The opening of the splined hub is configured to receive a portion of the piston of the removable wheel cover. The splined hub is configured to be attached to a wheel. The removable wheel cover is configured to be locked and unlocked with the splined hub. The splined hub further includes a detent to assist in locking with the removable wheel cover.

According to a configuration of the above implementation, the splined hub is configured to be removably attached to the wheel.

According to another configuration of the above implementation, the splined hub is attached to the wheel via a nut.

According to a further configuration of the above implementation, the shaft assembly further includes a button spring. The button spring biases the top surface of the push button mechanism in a direction toward the piston.

In a further aspect of the above implementation, the internal shaft is a piston screw.

In a further aspect of the above implementation, the shaft assembly further includes a plurality of ball bearings. The plurality of ball bearings assists in locking and unlocking the removable wheel cover indirectly or directly from the wheel.

In yet a further aspect of the above implementation, the push button mechanism includes a plurality of detents. Each of the plurality of detents has a semi-circular cross section.

In yet a further aspect of the above implementation, the shaft assembly further includes an expanding ring. The expanding ring assists in locking and unlocking the removable wheel cover indirectly or directly from the wheel.

According to a further aspect of the present disclosure, a wheel assembly includes a wheel and a removable wheel cover. The wheel includes a tire, a rim and a wheel hub. The removable wheel cover includes a disc and a shaft assembly. The shaft assembly is attached to the disc. The shaft assembly includes a splined shaft, a piston, a piston spring, a push button mechanism, and an internal shaft. The piston includes a walled structure forming an opening in which the internal shaft extends and moves therein. The push button mechanism further includes an exterior walled structure that is bridged by a top surface. The exterior walled structure of the push button mechanism surrounds at least a portion of the walled structure of the piston. The splined shaft includes a walled structure. The walled structure of the splined shaft surrounds at least a portion of the exterior walled structure of the push button mechanism. The piston spring biases the piston in a direction away from the top surface of the push button mechanism. The push button mechanism is configured to move to assist in unlocking the removable wheel cover indirectly or directly from a wheel According to a configuration of the above implementation, the removable wheel cover is configured to be locked and unlocked directly with the wheel.

According to another configuration of the above implementation, the wheel hub forms an integrated splined hub. The integrated splined hub forms an opening. The opening of the integrated splined hub forms at least one detent to assist in locking and unlocking the removable wheel cover and the wheel. The at least one detent of the wheel hub is a plurality of detents in one embodiment.

In a further aspect of the above implementation, the wheel assembly includes a splined hub. The splined hub includes a walled structured with an opening formed therein. The opening of the splined hub is configured to receive a portion of the piston of the removable wheel cover. The splined hub is configured to be removably attached to the wheel hub. The push button mechanism is configured to move to assist in unlocking the removable wheel cover indirectly from a wheel.

In a further aspect of the above implementation, the wheel assembly further includes an expanding clamp positioned in an opening formed in the wheel hub. The splined hub is attached to the expanding clamp via a fastener.

According to a one method of the present disclosure, a removable wheel cover assembly is installed into a wheel. A removable wheel cover is provided including a disc and a shaft assembly. The shaft assembly is attached to the disc. The shaft assembly includes a splined shaft, a piston, a piston spring, a push button mechanism, and an internal shaft. The piston includes a walled structure forming an opening in which the internal shaft extends and moves therein. The push button mechanism further includes an exterior walled structure that is bridged by a top surface. The exterior walled structure of the push button mechanism surrounds at least a portion of the walled structure of the piston. The splined shaft includes a walled structure. The walled structure of the splined shaft surrounds at least a portion of the exterior walled structure of the push button mechanism. The piston spring biases the piston in a direction away from the top surface of the push button mechanism. A splined hub is provided. The splined hub includes a walled structured with an opening formed therein. The splined hub is secured into a wheel. The removable wheel cover is placed into an opening in the splined hub such that the removable wheel cover locks with the splined hub.

According to a configuration of the above method, the method further includes pressing on the push button mechanism to unlock the removeable wheel cover and the splined hub.

According to a configuration of the above method, the removable wheel cover is placed into the opening of the wheel hub such that the removable wheel cover locks with the splined hub and unlocking the removeable wheel cover and the splined hub is performed in the absence of tooling.

The above summary is not intended to represent each embodiment or every aspect of the present invention. Additional features and benefits of the present invention are apparent from the detailed description and figures set forth below.

BRIEF DESCRIPTION OF THE DRAWINGS

Other advantages of the invention will become apparent upon reading the following detailed description and upon reference to the drawings in which.

Figures 1A, 1B, 1C:
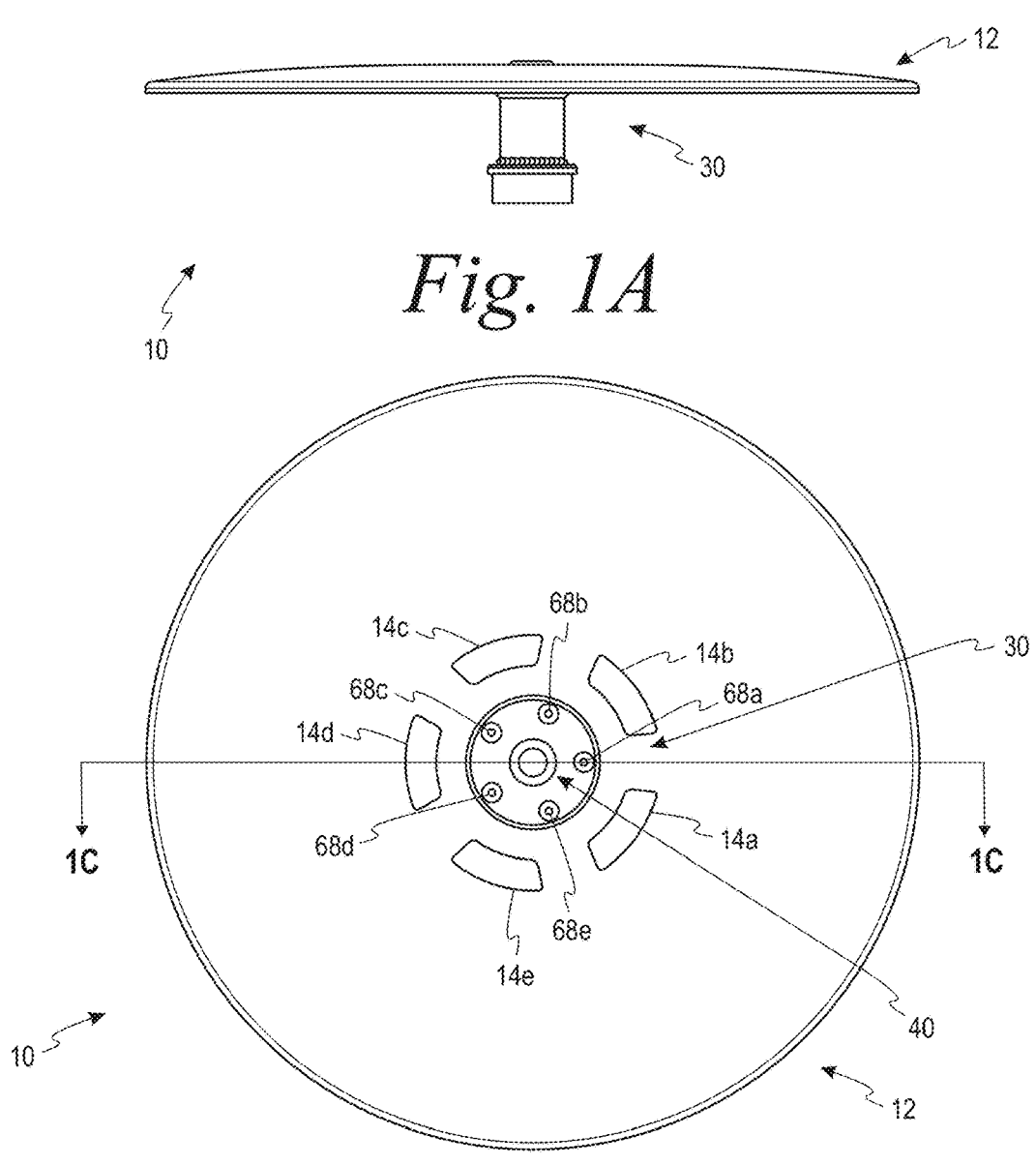
FIG. 1A is a side view of a removable wheel cover according to one embodiment.
FIG. 1B is a front view of the removable wheel cover of FIG. 1A.
FIG. 1C is a cross-sectional view taken generally along line 1C-1C of the removable wheel cover of FIG. 1B.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION

FIGS. 1A-1D illustrate a removable wheel cover 10 according to one embodiment. The removable wheel cover 10 includes a disc 12 and a splined shaft assembly 30 that is removably assembled or attached to the disc 12 in this embodiment. The removable wheel cover 10 is configured to provide improved aerodynamics to a wheel. Aerodynamics are important to vehicles to reduce drag and wind noise, minimize noise emission, and prevent or inhibit undesired lift forces and other causes of instabilities that occur at higher speeds. By being more aerodynamic, the vehicle runs more efficiently, yielding greater available range. The removable wheel cover 10 can be used on wheels of various vehicles including, but not limited to, cars, trucks and vans.

The disc 12 as shown best in FIG. 1B is generally circular shaped. More specifically, in this embodiment, the disc 12 is substantially circular shaped or circular shaped. The disc is typically shaped and sized to provide improved aerodynamics to a wheel. The disc typically covers or substantially covers a rim of the wheel. It is contemplated that the disc may be of other sizes and shapes.

The disc 12 forms a plurality of openings 14*a*-14*e* therein. The plurality of openings 14*a*-14*e* has several functions. The plurality of openings 14*a*-14*e* assists: (1) a user in handling the removable wheel cover when the removable wheel cover is being assembled or disassembled directly or indirectly from the wheel; and (2) in providing passive cooling to the components located within the rim, including the braking system. The plurality of openings 14*a*-14*e* is generally rectangular or generally trapezoidal shaped to assist a user in handling the removable wheel cover during assembly or disassembly. It is contemplated that the plurality of openings may be other shapes and sizes.

Figure 1D:
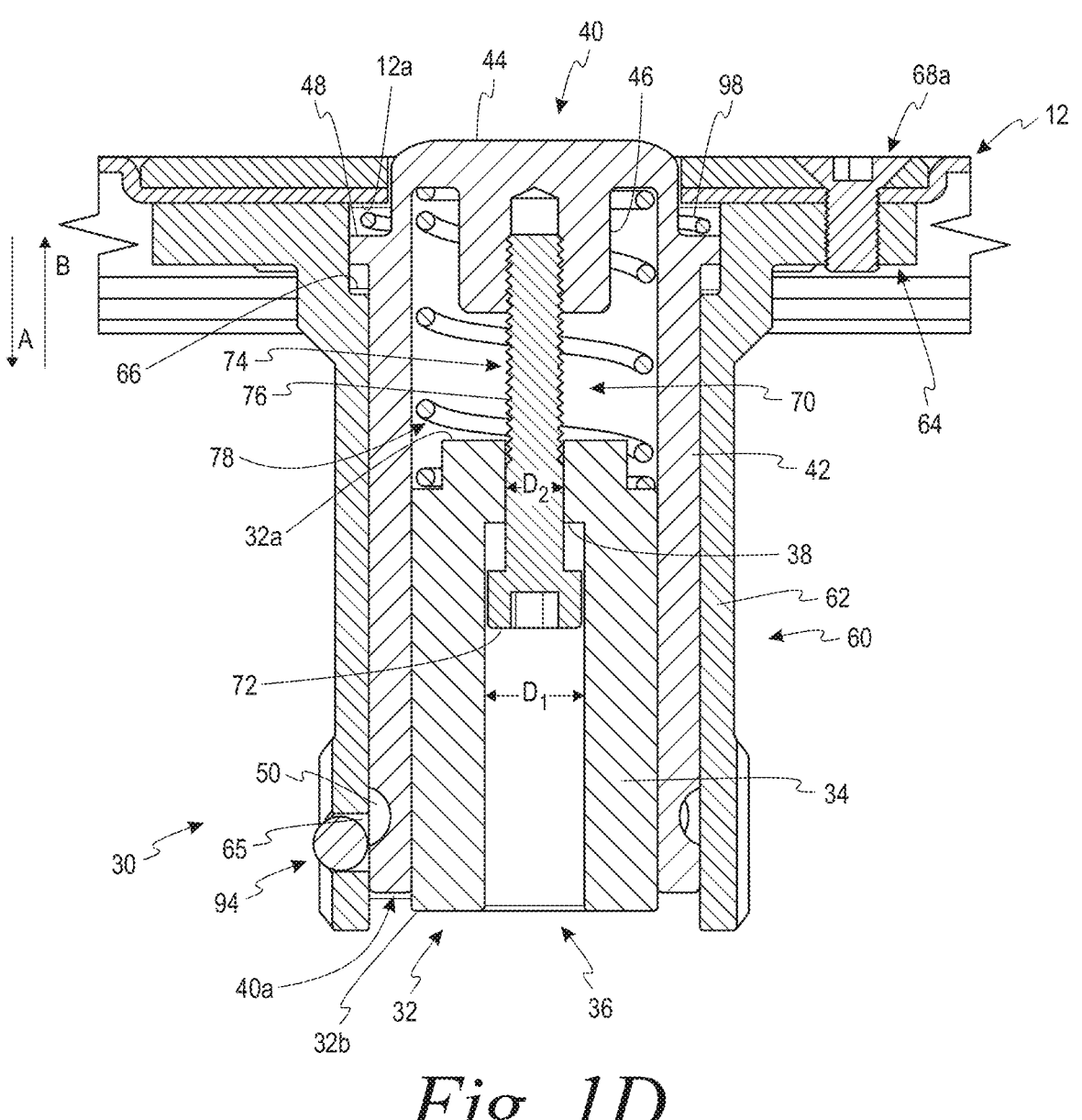
FIG. 1D is a partial, enlarged cross-sectional view of the removable wheel cover of FIG. 1C.

Referring to FIG. 1D, the splined shaft assembly 30 is shown in an enlarged cross-sectional view being assembled to the disc 12. The splined shaft assembly 30 includes a piston 32, a push button mechanism 40, a splined shaft 60, an internal shaft 70 (e.g., a piston screw 70 in this embodiment), and a piston spring 78 in this embodiment.

The piston 32 includes a walled structure 34 forming an opening 36 therethrough. The piston 32 has a first end 32*a* and a second end 32*b*. The opening 36 is shown as extending through the entire piston 32 (i.e., from the first end 32*a* to the second end 32*b*). It is contemplated that the opening may not extend all of the way through the piston.

The opening 36 is sized and configured to allow the internal shaft 70 to extend and move therein. The piston 32 has a generally circular cross-sectional shape, and the opening 36 also has a generally circular cross-sectional shape. The opening 36 has a first inner diameter D1 and a second inner diameter D2. The first inner diameter D1 is larger than the second inner diameter D2. The transition from the first inner diameter D1 to the second inner diameter D2 occurs at an internal shoulder 38 formed in the piston 32. The portion of the opening 36 with the second inner diameter D2 is located nearer the first end 32*a* of the piston 32 than the portion of the opening 36 with the first inner diameter D1. The piston spring 78 biases the piston 32 in a downwardly direction (in the direction of arrow A) in FIG. 1D, which is away from a top surface 44 of the push button mechanism 40. In practice, however, when the removable wheel cover 10 is installed directly or indirectly into a wheel, as will be discussed below, the piston spring 78 will bias the piston 32 in an inwardly direction into a wheel hub of a wheel.

In the embodiment shown in FIG. 1D, the internal shaft 70 has a head 72 and a threaded portion 74 attached to the head 72. The threaded portion 74 includes an external thread formation 76. A cross-section of the threaded portion 74 is generally circular shaped. As will be discussed below with respect to FIGS. 4A-4C, the size of the diameter D2 of the opening 36 assists in preventing or inhibiting the internal shaft 70 from being removed entirely from the opening 36. Specifically, the head 72 of the internal shaft 70 abuts against the internal shoulder 38 of the piston 32 when the internal shaft is moved in the direction of arrow B. The internal shaft 70 is threaded onto the push button mechanism 40. Thus, in this embodiment, any movement of the push button mechanism 40 in the direction of either arrow A or arrow B results in a corresponding movement of the internal shaft 70.

It is contemplated that the internal shaft may be other structures than a piston screw. For example, the internal shaft may be an unthreaded internal shaft that is attached to a push button mechanism. In another example, the internal shaft may be a structure formed integrally with the remainder of a push button mechanism. Thus, an internal shaft may be formed integrally with a remainder of a push button mechanism or attached to a push button mechanism. The internal shaft may be non-polygonal shaped (e.g., circular, oval) or polygonal shaped (e.g., square or rectangular). The shape of the opening of the piston will desirably generally correspond to the shape of the internal shaft.

As will be discussed in more detail below with respect to FIGS. 4A-4C, the push button mechanism 40 assists in unlocking the removable wheel cover 10 from a splined hub 80 in this embodiment. The push button mechanism 40 includes an exterior walled structure 42 that is bridged by the top surface 44. The top surface 44 includes an interior walled structure 46 extending downwardly (in the direction of arrow A) therefrom. The interior walled structure 46 is configured to receive the internal shaft 70. Specifically, in this embodiment, the interior walled structure 46 has an internal thread formation that is configured to threadingly receive the external thread formation 76 of the internal shaft 70 (a piston screw 70 in this embodiment). At or near an end 40*a* opposite of the top surface 44, the push button mechanism 40 forms a detent or recess 50. The detent 50 in this embodiment has a generally semi-circular shape. As will be explained below, the detent 50 assists in unlocking the removable wheel cover 10 from the splined hub 80 in one embodiment.

The exterior walled structure 42 of the push button mechanism 40 surrounds or telescopes at least a portion of the walled structure 34 of the piston 32. As will be discussed below, the push button mechanism 40 generally moves in the directions of arrows A and B independently from the piston 32.

In this embodiment, the splined shaft assembly 30 further includes a button spring 98. The button spring 98 biases the push button mechanism 40 in a downwardly direction (in the direction of arrow A) in FIG. 1D. The amount of travel of the push button mechanism 40 is limited by the movement of an outward extension 48 that extends from the exterior walled structure 42. The movement of the outward extension 48 is limited by an internal shoulder 66 of the splined shaft 60 in one direction and a surface 12a of the disc 12 in the other direction. In practice, however, with a wheel, the piston spring 78 will bias the piston 32 towards a wheel hub of a wheel in an unlocked position or state.

It is contemplated that a button spring may be omitted in other splined shaft assemblies. It is advantageous, however, to include a button spring because a user can more easily determine if the splined shaft assembly 30 is in a locked position by the position of the top surface 44 of the push button mechanism 40. If a button spring is not used, the push button mechanism 40 can more freely move and may be in a position that at first glance a user believes to be in a locked position, but is in an unlocked position. If the button spring is not used, a user will need to push down (toward the wheel) on the push button mechanism to lock the removable wheel cover indirectly or directly from a wheel. The functional aspects, as will be discussed below, of locking and unlocking does not change on whether a button spring is present.

Referring still to FIG. 1D, the splined shaft 60 includes a walled structure 62 and an outwardly extending flange 64. The outwardly extending flange 64 is generally perpendicular or perpendicular to the walled structure 62 in this embodiment. The outwardly extending flange 64 is located adjacent to the surface 12a of the disc 12. The walled structure 62 of the splined shaft 60 surrounds or telescopes at least a portion of the exterior walled structure 42 of the push button mechanism 40.

In this embodiment, as shown in FIGS. 1B, 1D, the outwardly extending flange 64 forms a plurality of threaded apertures that is configured to receive a corresponding one of a plurality of flange screws 68a-68e (only one of the flange screws 68a is shown in FIG. 1D). The plurality of flange screws 68a-68e assists in securing the splined shaft assembly 30 to the disc 12. By removing the plurality of flange screws 68a-68e, the disc 12 can be removed from the splined shaft assembly 30. It is contemplated that the number of flange screws may vary. It is also contemplated that other fasteners may be used or other methods for attaching or removably attaching a disc and a splined shaft assembly. It is also contemplated that other methods may be used for attaching or removably attaching a disc and a splined shaft assembly.

The splined shaft assembly 30 further includes a plurality of ball bearings 94. One of the plurality of ball bearings 94 is shown in FIG. 1D. The plurality of ball bearings 94 reside in a respective one of the plurality of apertures 65 formed in the splined shaft 60. One of the plurality of apertures 65 formed in the splined shaft 60 is shown in FIG. 1D. Each of the plurality of ball bearings 94 is generally circular in shape. As will be discussed in detail below, the plurality of ball bearings 94 assists in locking and unlocking the removable wheel cover 10 and the splined hub 80 in this embodiment.

The number of ball bearings in the splined shaft assembly 30 generally varies from about 3 to about 20. The number of ball bearings is typically from about 3 to about 10, and more typically from about 4 to about 8. The ball bearings 94 are typically spaced equidistant around the circumference of the splined shaft 60.

The locking and unlocking of the removable wheel cover and the splined hub may be performed by methods other than those using ball bearings. For example, one method may include an expanding ring that assists in locking and unlocking of the removable wheel cover and the splined hub. This will be discussed below in reference to FIGS. 5A-5C.

The disc 10 may be made of different materials. Non-limiting examples of material that may form the disc include metal and polymeric metals. Examples of metallic materials include, but are not limited to, aluminum and stainless steel. Examples of polymeric materials include, but are not limited to, polyolefins (e.g., acrylonitrile butadiene styrene (ABS)), carbon-fiber reinforced polymers, and nylon (e.g., nylon-filled material). One non-limiting example of a nylon-filled material is a glass-filled nylon. It is contemplated that other polyolefins may be used in forming the disc.

The splined shaft assembly 30 may be made of different materials. Non-limiting examples of material that may form the splined shaft assembly include metal and polymeric metals. Examples of metallic materials include, but are not limited to, aluminum and stainless steel. Examples of polymeric materials include, but are not limited to, polyolefins (e.g., acrylonitrile butadiene styrene (ABS)), carbon-fiber reinforced polymers, and nylon (e.g., nylon-filled material). One non-limiting example of a nylon-filled material is a glass-filled nylon. It is contemplated that other polyolefins may be used in forming the splined shaft assembly.

Figures 2A, 2B:
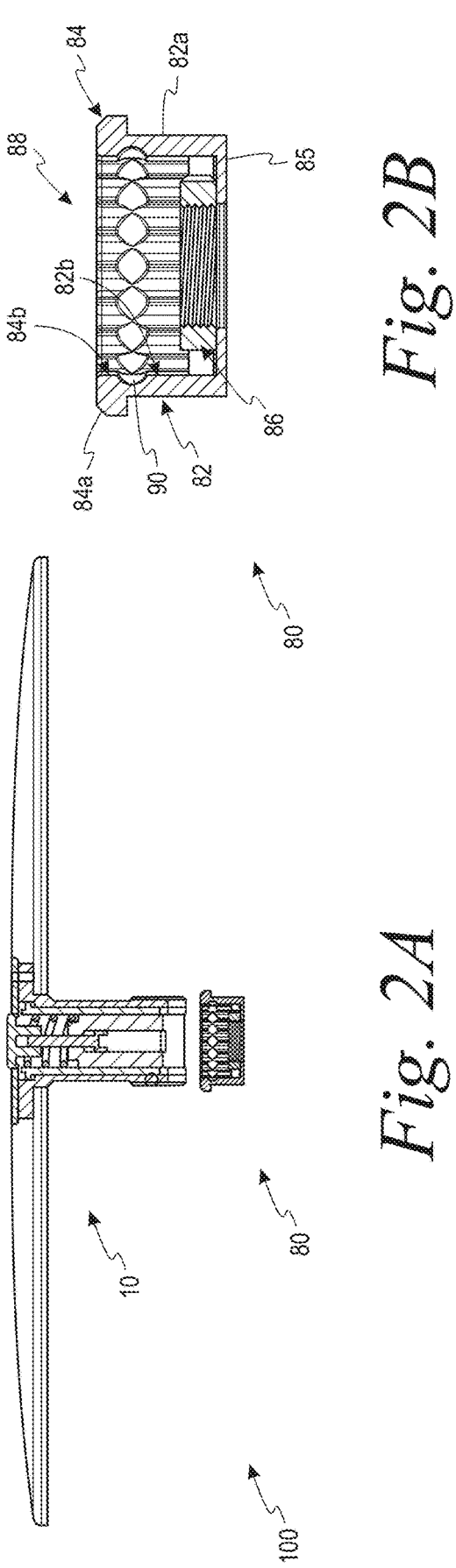
FIG. 2A is a removable wheel cover assembly including a full cross-sectional view of the removable wheel cover of FIG. 1D and a cross-sectional view of a splined hub of FIG. 2A according to one embodiment.
FIG. 2B is an enlarged cross-sectional view of the splined hub of FIG. 2A.

Turning to FIG. 2A, a removable wheel cover assembly 100 is shown. The removable wheel cover assembly 100 includes the removable wheel cover 10 and the splined hub 80 in an unattached or unlocked position. Referring specifically to FIG. 2B, the splined hub 80 includes an exterior walled structure 82, an outwardly extending flange 84, and a bottom 85. A nut 86 shown in FIG. 2B is used to threadingly engage a threaded axle end 120 of a vehicle as shown in FIGS. 4A-4C and to secure the splined hub 80 thereto. It is contemplated that the splined hub may include a threadable feature that engages with a threaded axle end of a vehicle.

Referring back to FIG. 2B, the exterior walled structure 82 forms an opening 88 that is sized to receive a portion of the splined shaft assembly 30. The exterior walled structure 82 includes an exterior surface 82a and an interior surface 82b. The outwardly extending flange 84 includes an exterior surface 84a and an interior surface 84b. A combination of the interior surface 82b of the exterior walled structure 82 and the interior surface 84b of the outwardly extending flange 84 forms a plurality of detents or recesses 90. In this embodiment, the plurality of detents or recesses 90 is an array of continuous detents or recesses. In one embodiment, the plurality of detents 90 extends around the entire interior surface 82b and the interior surface 84b. Each of the plurality of detents is generally a semi-circular shape, and is sized and shaped to receive one of the plurality of ball bearings 94 discussed above. It is noted that the number of ball bearings 94 is typically much less than the number of detents 90 formed in the splined hub 80.

When the ball bearings 94 are received in a respective one of the detents 90, the removable wheel cover 10 is in a locked position with the splined hub 80. Each of the ball bearings 94 will be locked at the same time in respective different detents 90 of the splined hub 80.

It is contemplated in another embodiment that an interior surface of the exterior wall structure of the splined hub may form the plurality of detents. In a further embodiment, an interior surface of the outwardly extending flange of the splined hub may form the plurality of detents.

The splined hub 80 may be made of different materials. Non-limiting examples of material that may form the splined hub include metal and polymeric metals. Examples of metallic materials include, but are not limited to, aluminum and stainless steel. Examples of polymeric materials include, but are not limited to, polyolefins (e.g., acrylonitrile butadiene styrene (ABS)), carbon-fiber reinforced polymers, and nylon (e.g., nylon-filled material). One non-limiting example of a nylon-filled material is a glass-filled nylon. It is contemplated that other polyolefins may be used in forming the splined hub.

Figures 3A, 3B, 3C:
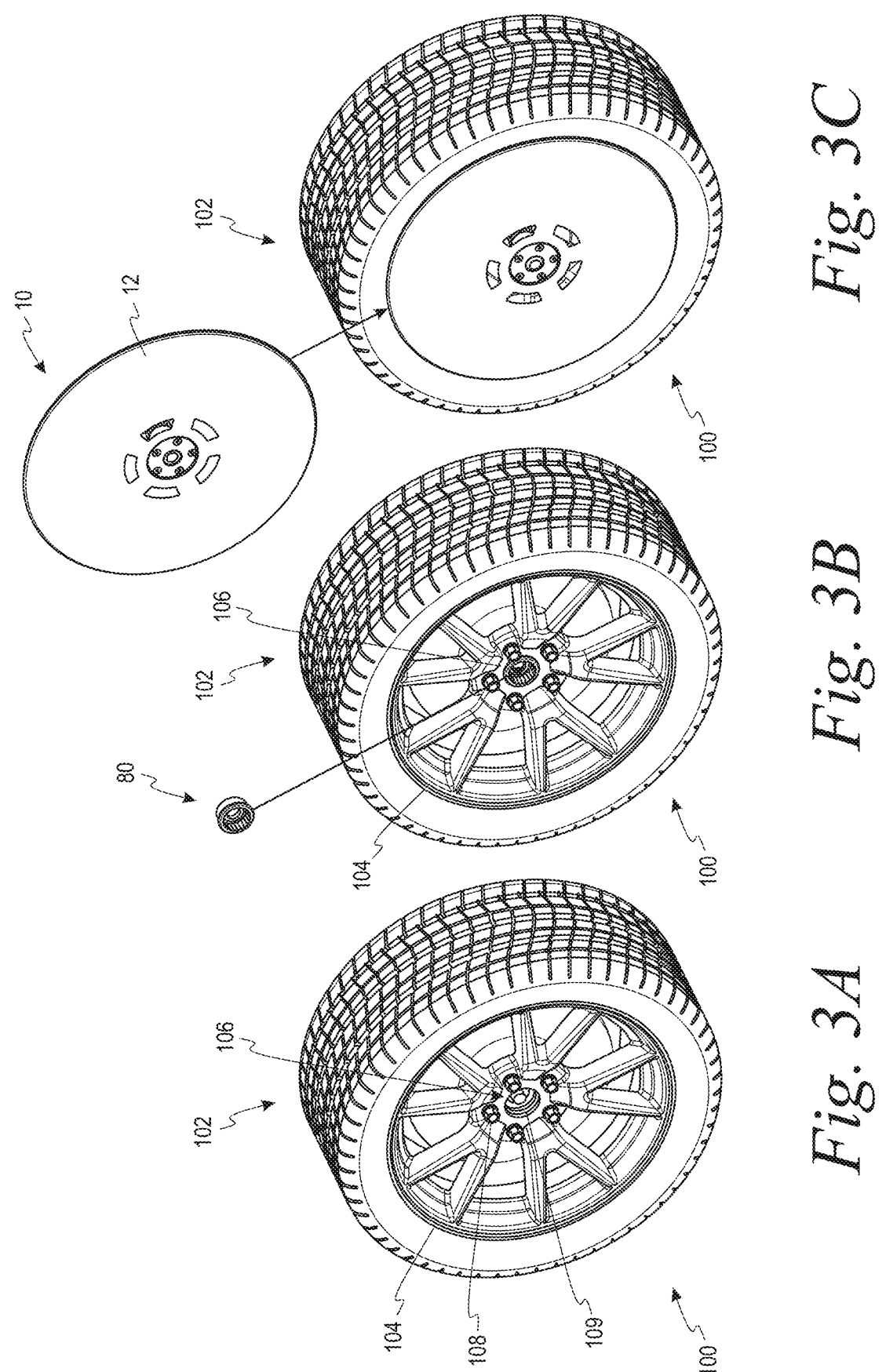
FIG. 3A is a front perspective view of a wheel according to one embodiment.
FIG. 3B is the front perspective view of the wheel of FIG. 3A with the splined hub of FIG. 2B being assembled therein.
FIG. 3C is the front perspective view of the wheel of FIG. 3A with the wheel cover of FIG. 1A being assembled to the splined hub of FIG. 2B.

Referring to FIGS. 3A-3C, a method of placing the removable wheel cover 10 and the splined hub 80 into a wheel 100 is shown. Referring initially to FIG. 3A, the wheel 100 includes a tire 102, a rim 104, and a wheel hub 106. The tire 102, which is the width of the wheel 100, surrounds the rim 104. The tire 102 gives the wheel 100 a grip on a road surface. The wheel hub 106 is where the wheel 100 is attached to a remainder of the vehicle. In this embodiment, the wheel hub 106 includes a plurality of lug nuts 108 to attach the wheel 100 to a wheel stud of the vehicle. The wheel hub 106 forms an internal opening 109.

The initial step in this process is to secure the splined hub 80 to the wheel hub 106. The splined hub 80 is threaded into the internal threaded opening 109 of the wheel hub 106 in FIG. 3B. In one embodiment, the splined hub 80 is threaded into a threaded axle end via the internal threaded opening 109. The removable wheel cover 10 is then attached or assembled with the splined hub 80. This is depicted in FIG. 3C.

Figures 4A, 4B, 4C:
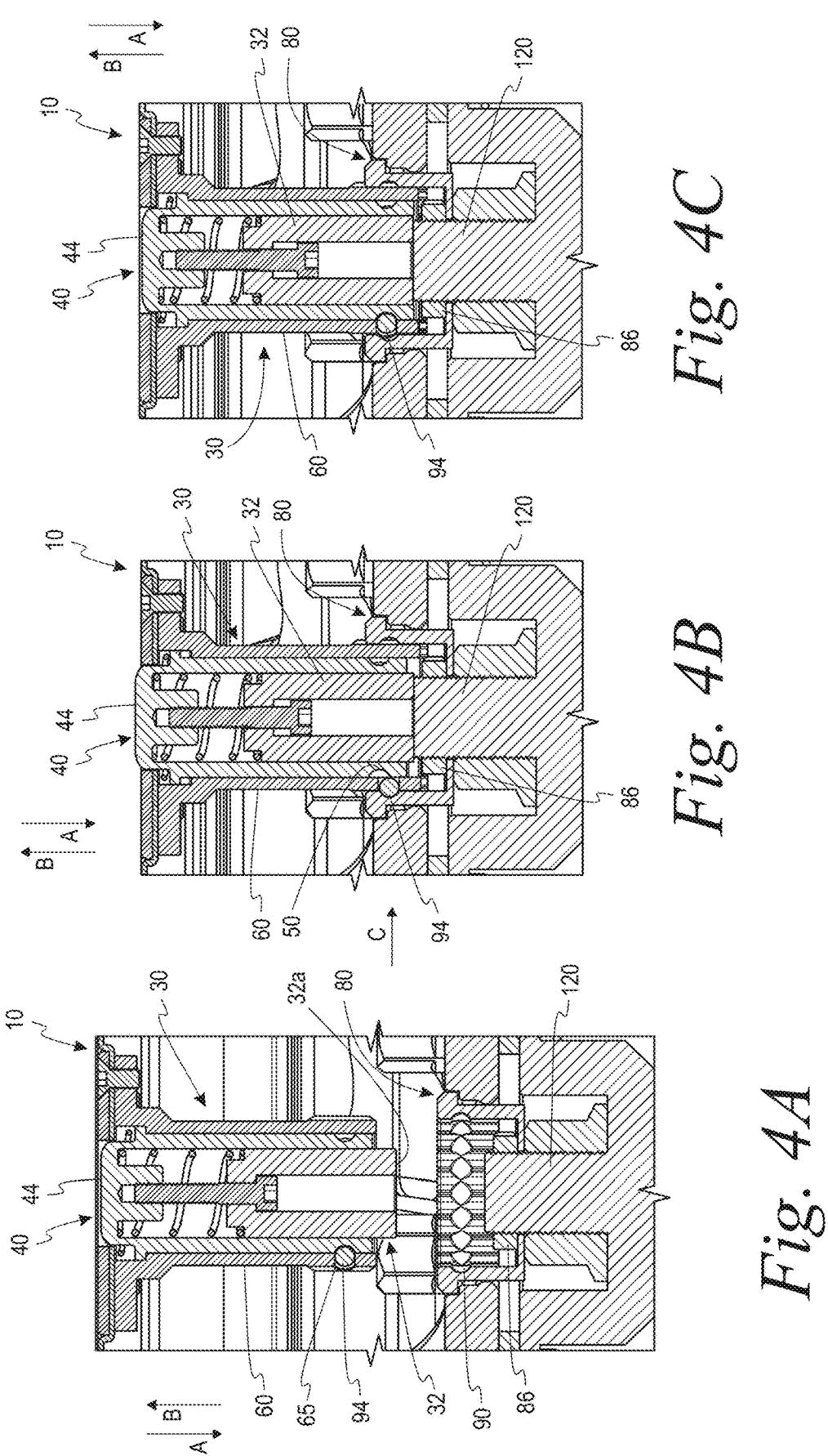
FIG. 4A is a cross-sectional view of a portion of the removable wheel cover of FIG. 1A in the process of being assembled or attached into the splined hub of FIG. 2B.
FIG. 4B is a cross-sectional view of a portion of the removable wheel cover of FIG. 1A being locked to the splined hub of FIG. 2B.
FIG. 4C is a cross-sectional view of a portion of the removable wheel cover of FIG. 1A being unlocked from the splined hub of FIG. 2B.

The process of locking and unlocking the removable wheel cover 10 to the splined hub 80 is shown in conjunction with various cross-sectional views of FIGS. 4A-4C. Referring initially to FIG. 4A, the splined hub 80 is threadingly engaged with a threaded axle end 120. More specifically, the nut 86 threadingly engages to the threaded axle end 120 and secures the splined hub 80.

Referring still to FIG. 4A, a user presses on the top surface 44 of the push button mechanism 40 in the direction of arrow A, which is in the direction of the splined hub 80 threaded into the threaded axle end 120. Thus, the removable wheel cover 10 is moving in the direction of arrow A towards the splined hub 80 and the threaded axle end 120.

As the removable wheel cover 10 continues moving toward the splined hub 80, an end 32a of the piston 32 contacts the threaded axle end 120 as shown in FIG. 4B. The top surface 44 of the push button mechanism 40 is popped up (direction of arrow B) at this point in the process. More, specifically, the top surface 44 of the push button mechanism 40 extends above (in the direction away from the splined hub 80) the remainder of the removable wheel cover 10. This indicates to a user that the removable wheel cover 10 is locked into the splined hub 80. In the locked position, the ball bearing 94 is located in the detent 90 of the splined hub 80 and the aperture 65 formed in the splined shaft 60. With the ball bearing 94 being partially in the detent 90 of the splined hub 80, a user cannot remove the removable wheel cover 10 from the splined hub 80 without pressing on the push button mechanism 40.

To unlock the removable wheel cover 10 from the splined hub 80, a user presses the top surface 44 of the push button mechanism 40 in the direction of arrow A in FIG. 4B. When the top surface 44 is pressed downwardly (in the direction of arrow A), the ball bearing 94 is biased inwardly (in the direction of arrow C) from the detent 90 of the splined hub 80 and into the detent 50 and the aperture 65 (see also FIG. 1D in a locked position). After the user presses the top surface 44 of the push button mechanism 40 in the direction of arrow A, the removable wheel cover 10 is unlocked as shown in FIG. 4C, which enables a user to move the removable wheel cover 10 in the direction of arrow B (away from the splined hub 80) to the position of FIG. 4A. In one embodiment, to assist in removing the removable wheel cover, a disc may be sized and shaped to have a spring force that deflects from the tire. In another embodiment, a disc may be sized and shaped not to contact the tire on unlocking from the splined hub.

Thus, a method of installing a removable wheel cover assembly into a wheel in one embodiment includes providing a removable wheel cover and providing a splined hub. The splined hub is secured onto a wheel. The removable wheel cover is placed into an opening in the splined hub such that the removable wheel cover locks with the splined hub.

Thus, the process of locking and unlocking the removable wheel cover 10 can be performed in the absence of any tooling. It is noted, however, that a tool is required for threading of the splined hub 80 onto the threaded axle end 120. The splined hub, however, is configured to remain in place after initial installation onto the threaded axle end.

In an effort to mitigate unwelcome wheel cover removal, a key locking mechanism may be desirable in other embodiments. Such a mechanism may be achieved via a key lock assembly located within the push button mechanism allowing an arm or a plurality of arms to rotate, via key turn, into a groove formed within the splined shaft. Such a configuration would lock the wheel cover to the wheel and would prevent or inhibit removal of the wheel cover without using the key. It is contemplated that other locking mechanisms may be used.

Figures 5A, 5B, 5C:
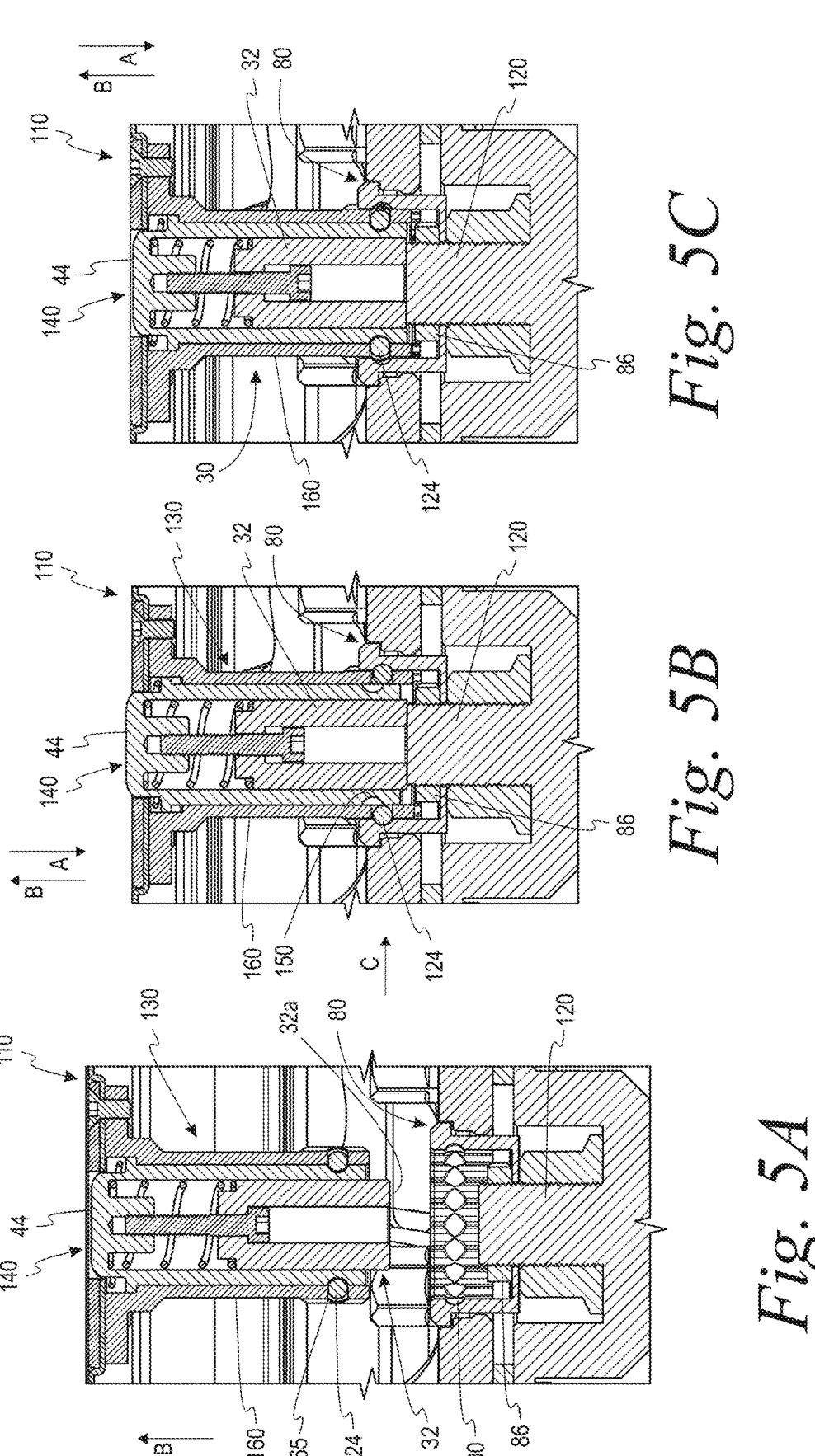
FIG. 5A is a cross-sectional view of a portion of a removable wheel cover according to another embodiment in the process of being assembled or attached into the splined hub of FIG. 2B.
FIG. 5B is a cross-sectional view of a portion of the removable wheel cover of FIG. 5A being locked to the splined hub of FIG. 2B.
FIG. 5C is a cross-sectional view of a portion of the removable wheel cover of FIG. 5A being unlocked from the splined hub of FIG. 2B.

As mentioned above, instead of using ball bearings, an expanding ring may be used that assists in locking and unlocking the removable wheel cover and the splined hub. Referring to FIGS. 5A-5C, a removable wheel cover 110 is depicted that includes an expanding ring 124 and a splined shaft assembly 130. The splined shaft assembly 130 is the same as the splined shaft assembly 30 except for the spacing for the expanding ring 124. The removable wheel cover 110 is almost identical to the removable wheel cover 10 except that the expanding ring 124 replaces the plurality of ball bearings 94. The expanding ring 124 in one embodiment is continuous around the circumference of splined shaft 160. The splined shaft 160 forms a continuous aperture 165 around its circumference and is configured to receive the expanding ring 124. Otherwise, the splined shaft 160 is the same as described above with the splined shaft 60. The push button mechanism 140 forms a continuous detent 150 around its circumference and functions in a similar manner as the detent 50 described above in locking and unlocking the removable wheel cover 10. Otherwise, the push button mechanism 140 is the same as described above with the push button mechanism 40.

The locking and unlocking of the removable wheel cover in FIGS. 5A-5C is the same as described above in FIGS.

4A-4C except the locking and unlocking is performed using the expanding ring 124 instead of the plurality of ball bearings 94. FIG. 5B shows the removable wheel cover is in a locked position, while FIG. 5C is in an unlocked position.

Figure 6A:
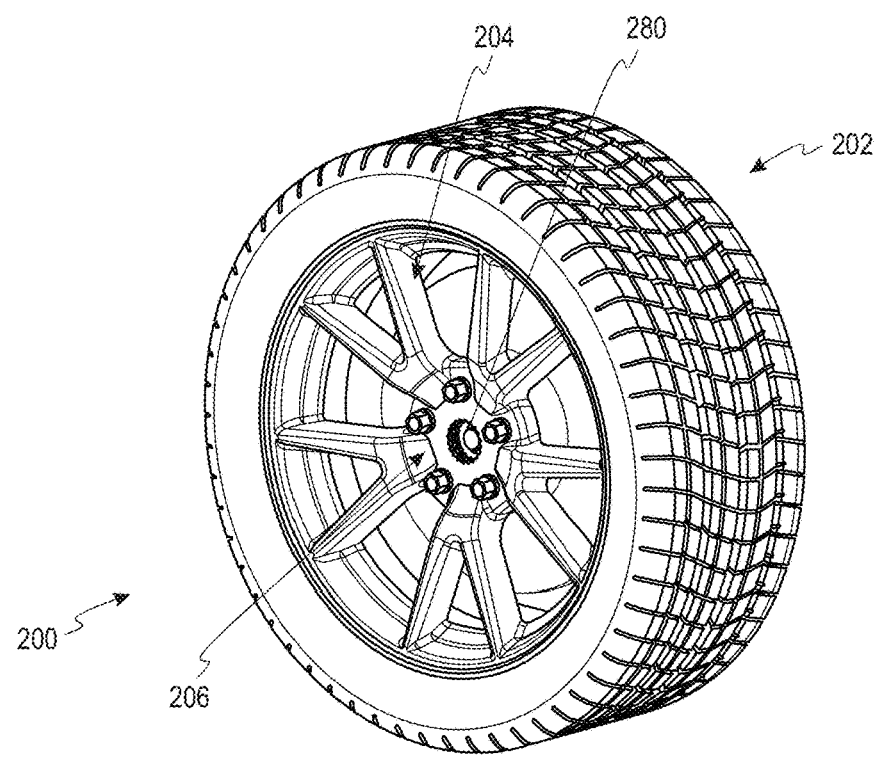
FIG. 6A is a front perspective view of a wheel with an integrated splined hub according to one embodiment.
Figure 6B:
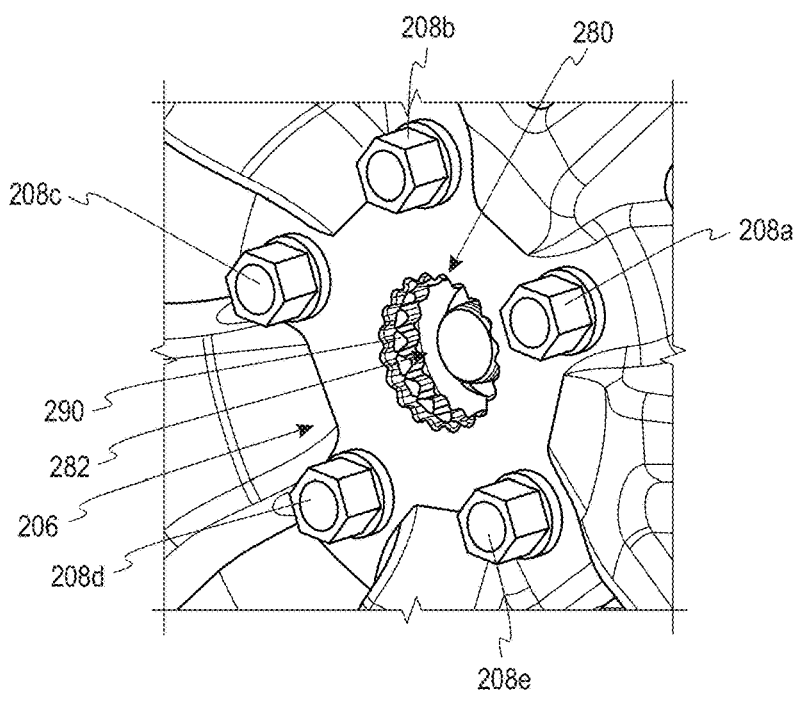
FIG. 6B is an enlarged front perspective view of a portion of the integrated splined hub of FIG. 6A.

In another embodiment, a wheel 200 includes an integrated splined hub 280 as shown in FIG. 6A. The wheel 200 includes a tire 202, a rim 204, and a wheel hub 206. The tire 202, which is the width of the wheel 200, surrounds the rim 204. The wheel hub 206 is where the wheel 200 is attached to a vehicle. The wheel hub 206 is shown in more detail in FIG. 6B. The wheel hub 206 includes a plurality of lug nuts 208a-e that attaches the wheel 200 to a wheel stud of the vehicle. A portion of the wheel hub 206 forms the integrated splined hub 280 that includes an opening 282 therein. The integrated splined hub 280 includes a plurality of detents 290 formed on an exterior surface. The integrated splined hub 280 is integral with the wheel hub 206 and, thus, cannot be removed.

The integrated splined hub 280 functions in the same or similar manner as the splined hub 80 discussed above. Thus, the integrated splined hub 280 is configured to receive the removable wheel cover 10 and assists in locking and unlocking the removable wheel cover 10. More specifically, the integrated splined hub 280 is configured to receive a portion of the splined shaft assembly 30. The detents 290 of the integrated splined hub 280 function in the same manner as the detents 90 discussed above in locking and unlocking the removable wheel cover 10.

Thus, a method of installing a removable wheel cover assembly into a wheel in this embodiment includes providing a removable wheel cover. The removable wheel cover is placed into an opening of the integrated splined hub. A top surface of the push button mechanism of the removable wheel cover is pressed until the removable wheel cover locks with the integrated splined hub.

Figure 7A:
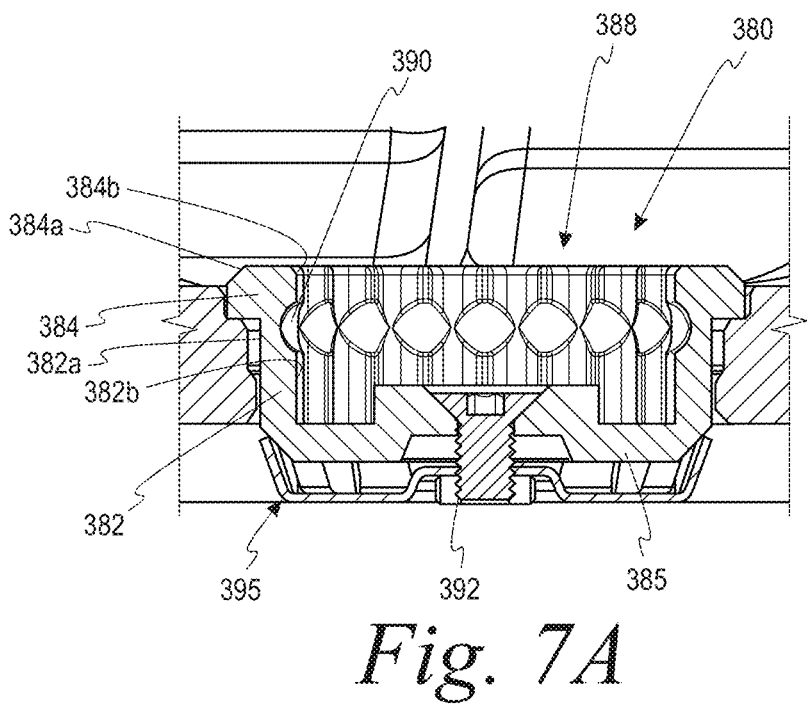
FIG. 7A is a splined hub with an expanding clamp in a contracted state according to one embodiment.
Figure 7B:
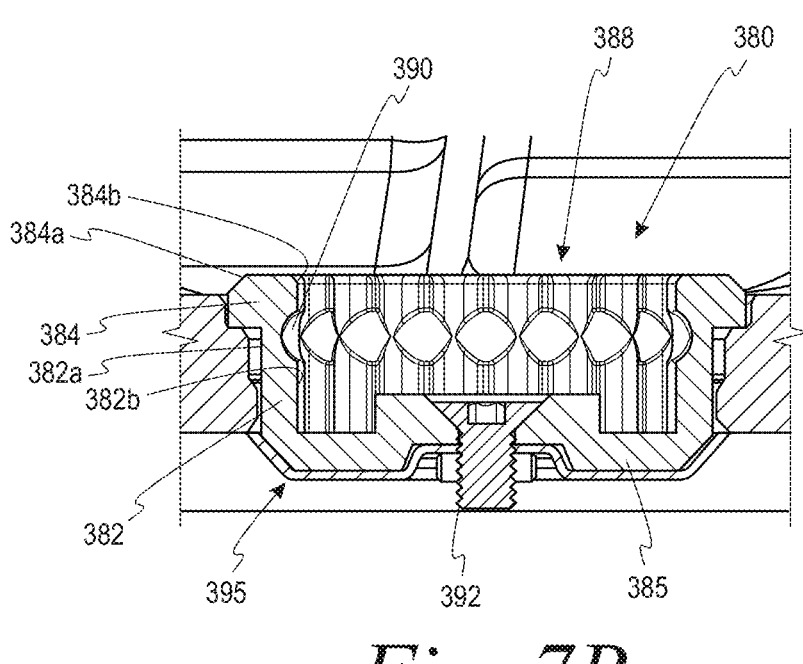
FIG. 7B is the splined hub with the expanding clamp of FIG. 7A in an expanded state.

In a further embodiment, a splined hub 380 is shown in FIGS. 7A, 7B. The splined hub 380 is shown in FIGS. 7A, 7B as being inserted into an expanding clamp 395. The expanding clamp 395 in FIG. 7A is in a closed state or position, while the expanding clamp in FIG. 7B is in an open state or position after having received the splined hub 380.

The splined hub 380 is used in conjunction with a fastener 392 (e.g., screw 392 in this embodiment). The splined hub 380 includes an exterior walled structure 382, an outwardly extending flange 384 and a bottom 385. The bottom 385 forms an opening that allows the screw 392 to extend therethrough. The screw 392 assists in attaching the splined hub 380 and the expanding clamp 395.

The exterior walled structure 382 forms an opening 388 that is sized to receive a portion of the splined shaft assembly 30. The exterior walled structure 382 includes an exterior surface 382a and an interior surface 382b. The outwardly extending flange 384 includes an exterior surface 384a and an interior surface 384b. The combination of the interior surface 382b of the exterior walled structure 382 and the interior surface 384b of the outwardly extending flange 384 forms a plurality or an array of detents or recesses 390. In one embodiment, the plurality of detents 390 extends around the entire interior surface 382b and the interior surface 384b. Each of the plurality of detents 390 is generally a semi-circular shape, and is sized and shaped to receive one of the plurality of ball bearings 94 as discussed above. When the ball bearings 94 are received in a respective one of the detents 390, the removable wheel cover 10 is in a locked position with the splined hub 380.

Figures 8A, 8B, 8C:
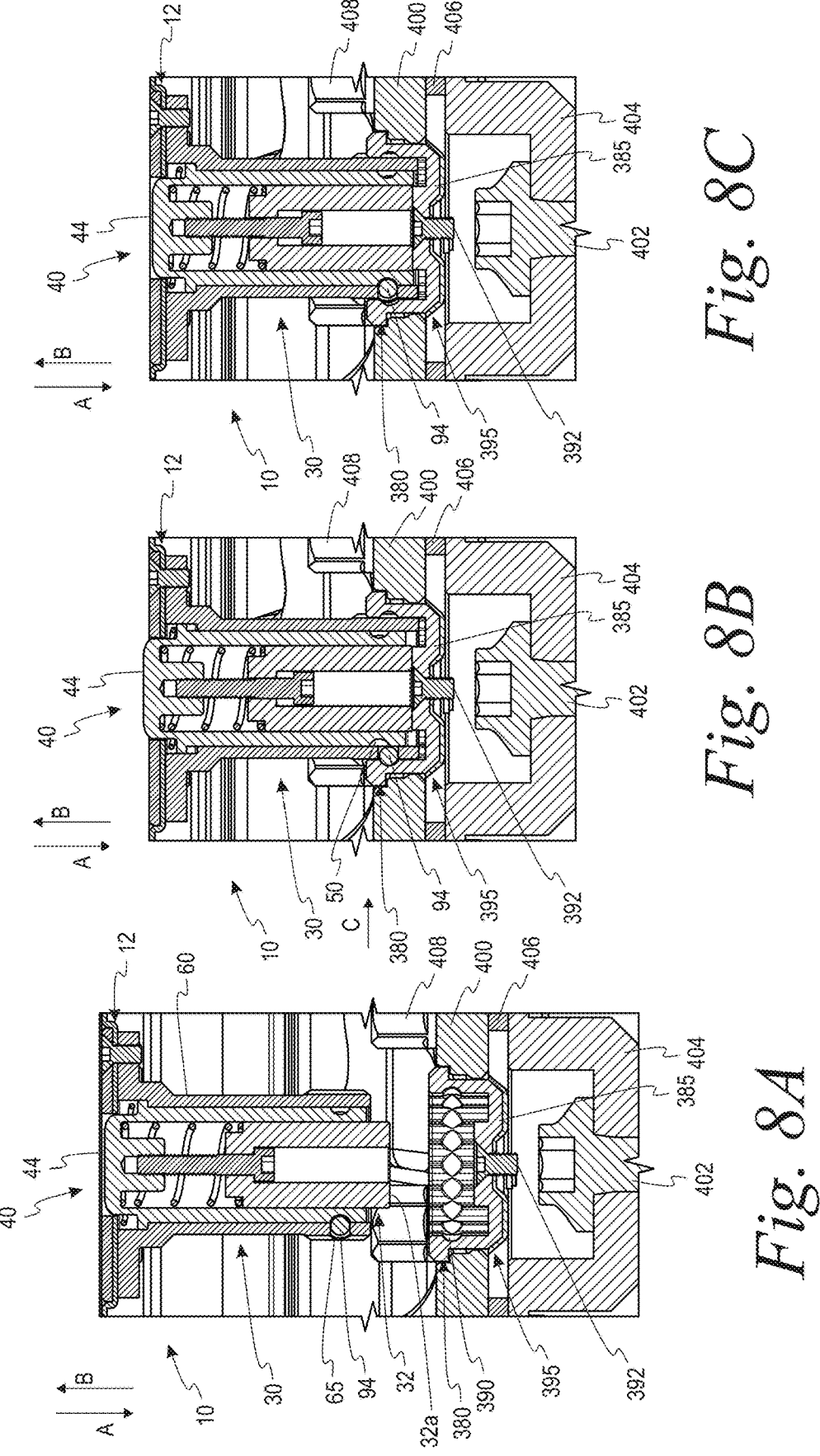
FIG. 8A is a cross-sectional view of a portion of the removable wheel cover of FIG. 1A in the process of being assembled or attached into the splined hub of FIG. 7B.
FIG. 8B is a cross-sectional view of a portion of the removable wheel cover of FIG. 1A being locked to the splined hub of FIG. 7B.
FIG. 8C is a cross-sectional view of a portion of the removable wheel cover of FIG. 1A being unlocked from the splined hub of FIG. 7B.

Referring to FIGS. 8A-8C, the removable wheel cover 10, including the disc 12 and the splined shaft assembly 30, is shown being assembled with the splined hub 380. Referring to FIG. 8A, a user presses on the top surface 44 of the push button mechanism 40 in the direction of arrow A, which is in the direction of the splined hub 380. Thus, the removable wheel cover 10 is moving in the direction of arrow A towards the splined hub 380.

As the removable wheel cover 10 continues moving toward the splined hub 380, an end 32a of the piston 32 contacts a top portion of the bottom 385 of the splined hub 380 and a portion of the screw 392. The top surface 44 of the push button mechanism 40 is popped up at this point in the process. More, specifically, the top surface 44 of the push button mechanism 40 extends above (in the direction away from the splined hub 380) the remainder of the removable wheel cover 10. This indicates to a user that the removable wheel cover 10 is locked into the splined hub 380. In the locked position, the ball bearing 94 is located in the detent 390 of the splined hub 380 and the aperture 65 formed in the splined shaft 60. With the ball bearing 94 being partially in the detent 390 of the splined hub 380, a user cannot remove the removable wheel cover 10 from the splined hub 380 without pressing on the push button mechanism 40.

To unlock the removable wheel cover 10 from the splined hub 380, a user presses the top surface 44 of the push button mechanism 40 in the direction of arrow A in FIG. 8B. When the top surface 44 is pressed downwardly (in the direction of arrow A), the ball bearing 94 is biased inwardly (in the direction of arrow C) from the detent 390 of the splined hub 380 and into the detents 50 and the aperture 65 (see also FIG. 1D in the locked position). After the user presses the top surface 44 of the push button mechanism 40 in the direction of arrow A, the removable wheel cover 10 is unlocked, which enables a user to move the removable wheel cover 10 in the direction of arrow B (away from the splined hub 380) to the position of FIG. 8A.

Thus, a method of installing a removable wheel cover assembly into a wheel in one embodiment includes providing a removable wheel cover and providing a splined hub. The splined hub is secured into a wheel with the assistance of the expanding clamp. The removable wheel cover is placed into an opening of the splined hub. A top surface of the push button mechanism of the removable wheel cover is pressed until the removable wheel cover locks with the splined hub.

FIGS. 8A-8C also depict an axle screw 402 that extends through an opening formed in a wheel bearing assembly 404. A disc brake rotor 406 is located between the wheel bearing assembly 404 and a wheel 400. A lug nut 408 attaches the wheel bearing assembly 404 to the wheel 400.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A removable wheel cover comprising:

a disc; and a shaft assembly being attached to the disc, the shaft assembly including a splined shaft, a piston, a piston spring, a push button mechanism, and an internal shaft, the piston including a walled structure forming an opening in which the internal shaft extends and moves therein, the push button mechanism further including an exterior walled structure that is bridged by a top surface, the exterior walled structure of the push button mechanism surrounding at least a portion of the walled structure of the piston, the splined shaft including a walled structure, the walled structure of the splined shaft surrounding at least a portion of the exterior walled structure of the push button mechanism, the piston spring biasing the piston in a direction radially away from the top surface of the push button mechanism, wherein the push button mechanism is configured to move to assist in unlocking the removable wheel cover indirectly or directly from a wheel.

2. The wheel cover of claim 1, wherein the disc is generally circular.

3. The wheel cover of claim 1, wherein the disc forms a plurality of apertures therein.

4. The wheel cover of claim 1, wherein the shaft assembly further includes a button spring, the button spring biasing the top surface of the push button mechanism in a direction radially toward the piston in an unlocked position.

5. The wheel cover of claim 1, wherein the shaft assembly is removably attached to the disc.

6. The wheel cover of claim 5, wherein the shaft assembly is removably attached to the disc via at least one screw.

7. The wheel cover of claim 1, wherein the internal shaft is a piston screw.

8. The wheel cover of claim 1, wherein the shaft assembly further includes a plurality of ball bearings, the plurality of ball bearings assisting in locking and unlocking the removable wheel cover indirectly or directly from the wheel.

9. The wheel cover of claim 8, wherein the splined shaft includes at least one opening and the push button mechanism includes at least one detent, the at least one opening of the splined shaft and the at least one detent of the push button mechanism configured to receive at least a portion of each of the plurality of ball bearings and assist in unlocking the removable wheel cover indirectly or directly from the wheel.

10. The wheel cover of claim 1, wherein the push button mechanism includes a plurality of detents, each of the plurality of detents having a semi-circular cross section.

11. The wheel cover of claim 1, wherein the shaft assembly further includes an expanding ring, the expanding ring assisting in locking and unlocking the removable wheel cover indirectly or directly from the wheel.

12. The wheel cover of claim 1, wherein the shaft assembly is a splined shaft assembly.

13. The wheel cover of claim 1, wherein the removable wheel cover is directly locked to the wheel.

14. The wheel cover of claim 1, wherein the removable wheel cover is indirectly locked to the wheel.

15. A removable wheel cover assembly comprising:

a removable wheel cover including a disc and a splined shaft assembly, the splined shaft assembly being attached to the disc, the splined shaft assembly including a splined shaft, a piston, a piston spring, a push button mechanism, and an internal shaft, the piston including a walled structure forming an opening in which the internal shaft extends and moves therein, the push button mechanism further including an exterior walled structure that is bridged by a top surface, the exterior walled structure of the push button mechanism surrounding at least a portion of the walled structure of the piston, the splined shaft including a walled structure, the walled structure of the splined shaft surrounding at least a portion of the exterior walled structure of the push button mechanism, the piston spring biasing the piston in a direction radially away from the top surface of the push button mechanism; and a splined hub including a walled structured with an opening formed therein, the opening of the splined hub configured to receive a portion of the piston of the removable wheel cover, the splined hub being configured to be attached to a wheel, wherein the removable wheel cover is configured to be locked and unlocked with the splined hub, wherein the splined hub further includes a detent to assist in locking with the removable wheel cover.

16. The removable wheel cover assembly of claim 15, wherein the splined hub is configured to be removably attached to the wheel.

17. The removable wheel cover assembly of claim 15, wherein the splined hub is attached to the wheel via a nut.

18. The removable wheel cover assembly of claim 15, wherein the shaft assembly further includes a button spring, the button spring biasing the top surface of the push button mechanism in a direction radially toward the piston.

19. The removable wheel cover assembly of claim 15, wherein the internal shaft is a piston screw.

20. The removable wheel cover assembly of claim 15, wherein the shaft assembly further includes a plurality of ball bearings, the plurality of ball bearings assisting in locking and unlocking the removable wheel cover indirectly or directly from the wheel.

21. The removable wheel cover assembly of claim 15, wherein the push button mechanism includes a plurality of detents, each of the plurality of detents having a semi-circular cross section.

22. The removable wheel cover assembly of claim 15, wherein the shaft assembly further includes an expanding ring, the expanding ring assisting in locking and unlocking the removable wheel cover indirectly or directly from the wheel.

23. A wheel assembly comprising:

a wheel including a tire, a rim and a wheel hub; and a removable wheel cover including a disc and a shaft assembly, the shaft assembly being attached to the disc, the shaft assembly including a splined shaft, a piston, a piston spring, a push button mechanism, and an internal shaft, the piston including a walled structure forming an opening in which the internal shaft extends and moves therein, the push button mechanism further including an exterior walled structure that is bridged by a top surface, the exterior walled structure of the push button mechanism surrounding at least a portion of the walled structure of the piston, the splined shaft including a walled structure, the walled structure of the splined shaft surrounding at least a portion of the exterior walled structure of the push button mechanism, the piston spring biasing the piston in a direction radially away from the top surface of the push button mechanism, wherein the push button mechanism is configured to move to assist in unlocking the removable wheel cover indirectly or directly from a wheel.

24. The wheel assembly of claim 23, wherein the removable wheel cover is configured to be locked and unlocked directly with the wheel.

25. The wheel assembly of claim 24, wherein the wheel hub forms an integrated splined hub, the integrated splined hub forming an opening, the opening of the integrated splined hub forming at least one detent to assist in locking and unlocking the removable wheel cover and the wheel.

26. The wheel assembly of claim 25, wherein the at least one detent of the wheel hub is a plurality of detents.

27. The wheel assembly of claim 23 further comprising a splined hub, the splined hub including a walled structured with an opening formed therein, the opening of the splined hub configured to receive a portion of the piston of the removable wheel cover, the splined hub being configured to be removably attached to the wheel hub, and wherein the push button mechanism is configured to move to assist in unlocking the removable wheel cover indirectly from the wheel.

28. The wheel assembly of claim 23 further including an expanding clamp positioned in an opening formed in the wheel hub, the splined hub being attached to the expanding clamp via a fastener.

29. A method of installing a removable wheel cover assembly into a wheel, the method comprising:

providing a removable wheel cover including a disc and a shaft assembly, the shaft assembly being attached to the disc, the shaft assembly including a splined shaft, a piston, a piston spring, a push button mechanism, and an internal shaft, the piston including a walled structure forming an opening in which the internal shaft extends and moves therein, the push button mechanism further including an exterior walled structure that is bridged by a top surface, the exterior walled structure of the push button mechanism surrounding at least a portion of the walled structure of the piston, the splined shaft including a walled structure, the walled structure of the splined shaft surrounding at least a portion of the exterior walled structure of the push button mechanism, the piston spring biasing the piston in a direction radially away from the top surface of the push button mechanism;

providing a splined hub, the splined hub including a walled structured with an opening formed therein;

securing the splined hub into the wheel;

placing the removable wheel cover into an opening in the splined hub such that the removable wheel cover locks with the splined hub.

30. The method of claim 29 further including pressing on the push button mechanism to unlock the removeable wheel cover and the splined hub.

31. The method of claim 30, wherein the placing of the removable wheel cover into the opening of the wheel hub such that the removable wheel cover locks with the splined hub and unlocking the removeable wheel cover and the splined hub is performed in the absence of tooling.

* * * * *